United States Patent
Oketani (10) Patent No.: US 11,309,772 B2
(45) Date of Patent: Apr. 19, 2022

(54) ELECTRIC MOTOR, AIR CONDITIONER, VACUUM CLEANER, AND METHOD FOR PRODUCING ELECTRIC MOTOR

(71) Applicant: Mitsubishi Electric Corporation, Tokyo (JP)

(72) Inventor: Naohiro Oketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 198 days.

(21) Appl. No.: 16/608,883

(22) PCT Filed: Jul. 10, 2017

(86) PCT No.: PCT/JP2017/025113
§ 371 (c)(1),
(2) Date: Oct. 28, 2019

(87) PCT Pub. No.: WO2019/012574
PCT Pub. Date: Jan. 17, 2019

(65) Prior Publication Data
US 2020/0227981 A1 Jul. 16, 2020

(51) Int. Cl.
*H02K 9/22* (2006.01)
*A47L 5/22* (2006.01)
(Continued)

(52) U.S. Cl.
CPC .................. *H02K 9/22* (2013.01); *A47L 5/22* (2013.01); *A47L 9/22* (2013.01); *A47L 9/2889* (2013.01);
(Continued)

(58) Field of Classification Search
CPC ............ H02K 3/22; H02K 3/32; H02K 3/325; H02K 3/34; H02K 3/345
(Continued)

(56) References Cited

U.S. PATENT DOCUMENTS

2002/0079761 A1* 6/2002 Nishimura .............. A47L 9/281
310/75 R
2009/0322180 A1 12/2009 Nonaka
(Continued)

FOREIGN PATENT DOCUMENTS

| CN | 1145544 A | 3/1997 |
| CN | 101669267 A | 3/2010 |

(Continued)

OTHER PUBLICATIONS

International Search Report of the International Searching Authority dated Sep. 19, 2017 for the corresponding International application No. PCT/JP2017/025113 (and English translation).
(Continued)

*Primary Examiner* — Quyen P Leung
*Assistant Examiner* — Minki Chang
(74) *Attorney, Agent, or Firm* — Posz Law Group, PLC (57) ABSTRACT

An electric motor includes a stator, and a metal component that is in contact with the stator. The stator includes a first tooth, a second tooth, a first winding wound around the first tooth by concentrated winding, a second winding wound around the second tooth by concentrated winding, and a thermal conduction sheet held between the first winding and the second winding. The thermal conduction sheet is held between the metal component and the first winding in a deformed state.

14 Claims, 8 Drawing Sheets

(51) Int. Cl.
    *A47L 9/22*     (2006.01)
    *A47L 9/28*     (2006.01)
    *F24F 1/0018*     (2019.01)
    *H02K 1/14*     (2006.01)
    *H02K 3/18*     (2006.01)
    *H02K 3/28*     (2006.01)
    *H02K 7/08*     (2006.01)
    *H02K 15/02*     (2006.01)
    *H02K 21/16*     (2006.01)

(52) U.S. Cl.
    CPC ........... *F24F 1/0018* (2013.01); *H02K 1/146* (2013.01); *H02K 3/18* (2013.01); *H02K 3/28* (2013.01); *H02K 7/083* (2013.01); *H02K 15/022* (2013.01); *H02K 21/16* (2013.01)

(58) Field of Classification Search
    USPC .............................................. 310/64, 65, 215
    See application file for complete search history.

(56) References Cited

U.S. PATENT DOCUMENTS

| | | |
|---|---|---|
| 2011/0156504 A1 | 6/2011 | Kurahara et al. |
| 2013/0106212 A1 | 5/2013 | Nakazumi et al. |
| 2016/0036279 A1* | 2/2016 | Aso ........................ H02K 5/225 310/43 |
| 2020/0232457 A1* | 7/2020 | Kataoka .................. F04C 2/102 |

FOREIGN PATENT DOCUMENTS

| | | | |
|---|---|---|---|
| CN | 103095031 A | 5/2013 | |
| EP | 0748025 A2 | 11/1996 | |
| EP | 0748025 A2 * | 12/1996 | ............ H02K 1/148 |
| JP | H10-174371 A | 6/1998 | |
| JP | 2000-116063 A | 4/2000 | |
| JP | 2001-144689 A | 5/2001 | |
| JP | 2002-369449 A | 12/2002 | |
| JP | 2003-018796 A | 1/2003 | |
| JP | 2008-206302 A | 9/2008 | |
| JP | 2008-278654 A | 11/2008 | |
| JP | 2009-118572 A | 5/2009 | |
| JP | 2010-233374 A | 10/2010 | |
| JP | 2011-139555 A | 7/2011 | |

OTHER PUBLICATIONS

Chinese Office Action dated Jan. 22, 2021, issued in in corresponding CN Patent Application No. 201780092520.1 (and English Machine Translation).

\* cited by examiner

ELECTRIC MOTOR, AIR CONDITIONER, VACUUM CLEANER, AND METHOD FOR PRODUCING ELECTRIC MOTOR

CROSS REFERENCE TO RELATED APPLICATION

This application is a U.S. national stage application of International Patent Application No. PCT/JP2017/025113 filed on Jul. 10, 2017, the disclosure of which is incorporated herein by reference.

TECHNICAL FIELD

The present invention relates to an electric motor.

BACKGROUND

In recent years, with a reduction in size and weight of electric motors, the output density that is the ratio of the output to the mass of the electric motor is increasing. As the output density increases, the temperature of the electric motor rises. As the temperature of the electric motor rises, for example, the electrical resistance of a winding increases, the copper loss increases, and the efficiency of the electric motor thus lowers. When a rare-earth magnet containing Nd—Fe—B (neodymium-iron-boron) or a rare-earth magnet containing Sm—Fe—N (samarium-iron-nitrogen) is used as a permanent magnet for a permanent magnet synchronous electric motor, as the temperature of the electric motor rises, the magnetic force and the coercive force of the permanent magnet decrease, and the demagnetization resistance of the permanent magnet and the efficiency of the electric motor lower. Furthermore, as the temperature of the electric motor rises, an insulator insulating a stator and the surface (more specifically, an insulating coating) of the winding are damaged, and a quality failure of the electric motor may thus occur.

Of the total heat generated by the electric motor, heat from the winding resulting from copper loss, and heat from a stator core resulting from iron loss are dominant. The heat from the stator core is conducted to a frame covering the stator and is exhausted outside the electric motor. Although the winding is in contact with the insulator electrically insulating the stator, since the heat radiation effect of the insulator is small, the heat from the winding can be hardly exhausted outside the electric motor.

Hence, it is not easy to exhaust the heat from the winding outside the electric motor compared to the heat from the stator core, and the temperature of the winding rises more readily than that of the stator core. As the temperature of the winding rises, the electrical resistance of the winding increases and the copper loss increases, so that it results in a vicious cycle of a further rise in the temperature of the winding.

In view of this, a method has been proposed to bring a resin sheet serving as a thermal conduction sheet for conducting heat into contact with coil ends to conduct the heat from the winding to the frame serving as a heat radiating portion and exhaust this heat outside the electric motor (see, for example, patent reference 1).

PATENT REFERENCE

Patent Reference 1: Japanese Patent Application Publication No. H10-174371

In the conventional technique, however, a problem has arisen in that a portion in which the thermal conduction sheet is in contact with the winding is small, and the cooling performance is therefore insufficient. In the conventional technique, as another problem, in the process of producing the electric motor, since the thermal conduction sheet is easily detached from the winding, it is difficult to assemble the stator in the state where the thermal conduction sheet comes in contact with the winding.

SUMMARY

The present invention has been made in consideration of the above-described problems, and has an object to improve the cooling performance in the electric motor and facilitate assembly of the stator in a state where the thermal conduction sheet comes in contact with the winding with a simple configuration.

An electric motor according to an aspect of the present invention includes a stator, and a metal component that is in contact with the stator, the stator including a first tooth, a second tooth, a first winding wound around the first tooth by concentrated winding, a second winding wound around the second tooth by concentrated winding, a first thermal conduction sheet held between the first winding and the second winding and to conduct heat of the first winding to the metal component, and a second thermal conduction sheet held between the first winding and the second winding and to conduct heat of the second winding to the metal component, wherein the first thermal conduction sheet is wound around the first winding, the second thermal conduction sheet is wound around the second winding, the first thermal conduction sheet is held between the metal component and the first winding in a deformed state, and the second thermal conduction sheet is held between the metal component and the second winding in a deformed state.

According to the present invention, it is possible to improve the cooling performance in the electric motor and facilitate assembly of the stator in a state where the thermal conduction sheet comes in contact with the winding with a simple configuration.

EMBODIMENT 1

Figure 1:
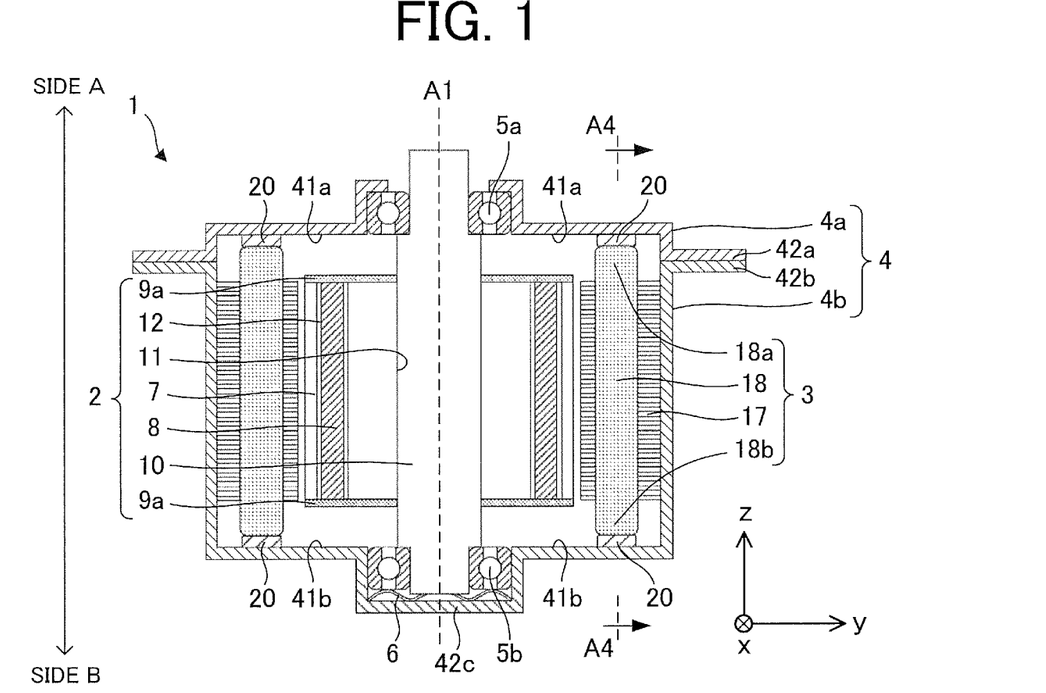
FIG. 1 is a sectional view schematically illustrating a structure of an electric motor according to Embodiment 1 of the present invention.

FIG. 1 is a sectional view schematically illustrating a structure of an electric motor 1 according to Embodiment 1 of the present invention.

In an x-y-z orthogonal coordinate system illustrated in each drawing, the z-direction (z-axis) indicates a direction (to be also referred to as the "axial direction of a rotor 2" or simply as the "axial direction" hereinafter) parallel to an axis A1 (that is, the axis of rotation of the rotor 2) of a shaft 10 of the electric motor 1, the x-direction (x-axis) indicates a direction perpendicular to the z-direction (z-axis), and the y-direction indicates a direction perpendicular to both the z- and x-directions.

The electric motor 1 is implemented as, for example, an inner rotor IPM (Interior Permanent Magnet) motor, but the present invention is not limited to this. The electric motor 1 may be implemented as, for example, an SPM (Surface Permanent Magnet) motor. The electric motor 1 is used as, for example, a fan motor or a blower motor.

The electric motor 1 includes the rotor 2, a stator 3, a frame 4 that is a metal frame as a metal component, bearings 5a and 5b, and a compression spring 6. The upper side in FIG. 1 will be referred to as a side A (also called a first side) hereinafter, and the lower side in FIG. 1 will be referred to as a side B (also called a second side) hereinafter. In the example illustrated in FIG. 1, the side A corresponds to the load side, and the side B corresponds to the counter-load side, but the side B may correspond to the load side, and the side A may correspond to the counter-load side.

The bearings 5a and 5b rotatably support the rotor 2. The bearing 5a is fixed on the side A (more specifically, a frame portion 4a) of the frame 4, and the bearing 5b is fixed on the side B (more specifically, a frame portion 4b) of the frame 4.

The frame 4 covers the stator 3. At least a part of the frame 4 is exposed outside the electric motor 1. The frame 4 is made of a metal material such as iron or aluminum. In this Embodiment, the frame 4 includes the frame portions 4a and 4b. More specifically, the frame 4 is divided into two frames (that is, the frame portions 4a and 4b) in a plane perpendicular to the axis of rotation of the rotor 2. Each of the frame portions 4a and 4b has a cup shape.

The frame 4 includes an inner surface 41a (first inner surface) formed on one end side (the side A illustrated in FIG. 1) in the axial direction, and an inner surface 41b (second inner surface) formed on the other end side (the side B illustrated in FIG. 1) in the axial direction.

The frame portion 4a includes a flange portion 42a formed on the opening side (the side B illustrated in FIG. 1), and the inner surface 41a. The frame portion 4a supports the rotor 2 on the side A via the bearing 5a.

The frame portion 4b includes a flange portion 42b formed on the opening side (the side A illustrated in FIG. 1), the inner surface 41b, and a closed bottom portion 42c. The frame portion 4b supports the rotor 2 on the side B via the bearing 5b. The stator 3 is fixed in the frame portion 4b.

The flange portion 42a of the frame portion 4a is in contact with the flange portion 42b of the frame portion 4b, and the flange portion 42a of the frame portion 4a is fixed to the flange portion 42b of the frame portion 4b by, for example, an adhesive, a screw, or welding.

The compression spring 6 is interposed between the bearing 5b and the closed bottom portion 42c of the frame portion 4b. The compression spring 6 applies a preload to the bearing 5b. With this arrangement, a preload is also applied to the bearing 5a. As the compression spring 6, a wave washer, for example, is used.

The rotor 2 includes a rotor core 7, a permanent magnet or permanent magnets 8, end plates 9a and 9b, and the shaft 10. The rotor 2 is inserted inside the stator 3.

The rotor core 7 is formed by, for example, stacking, in the axial direction, a plurality of electrical steel sheets stamped into a predetermined shape. The cross-sectional shape (the two-dimensional shape perpendicular to the axial direction) of the rotor core 7 is a circle. A shaft hole 11 and a magnet insertion hole or magnet insertion holes 12 are formed in the rotor core 7.

The shaft hole 11 is designed as a through hole formed in the axial direction. The shaft 10 is inserted into the shaft hole 11. The center of the shaft hole 11 in the radial direction (to be also simply referred to as the "radial direction" hereinafter) of the stator 3 coincides with the center of the rotor core 7 in the radial direction.

In this Embodiment, a plurality of magnet insertion holes 12 are formed in the rotor core 7 at regular intervals in the circumferential direction of the stator 3 about the axis A1 (to be simply referred to as the "circumferential direction" hereinafter). The magnet insertion holes 12 are designed as through holes formed in the axial direction. Each magnet insertion hole 12 is formed closer to the outer circumferential surface of the rotor core 7 than the shaft hole 11. The permanent magnet 8 is inserted into each magnet insertion hole 12.

The permanent magnet 8 is, for example, a rare-earth magnet. An example of the shape of the permanent magnet 8 is a rectangular parallelepiped.

The end plates 9a and 9b close the opening portions, on the sides A and B, respectively, of the magnet insertion hole 12. This prevents the permanent magnet 8 from falling off the magnet insertion hole 12.

An example of the cross-sectional shape (the two-dimensional shape perpendicular to the axial direction) of the shaft 10 is a circle. The shaft 10 is rotatably supported by the bearings 5a and 5b.

Figure 2:
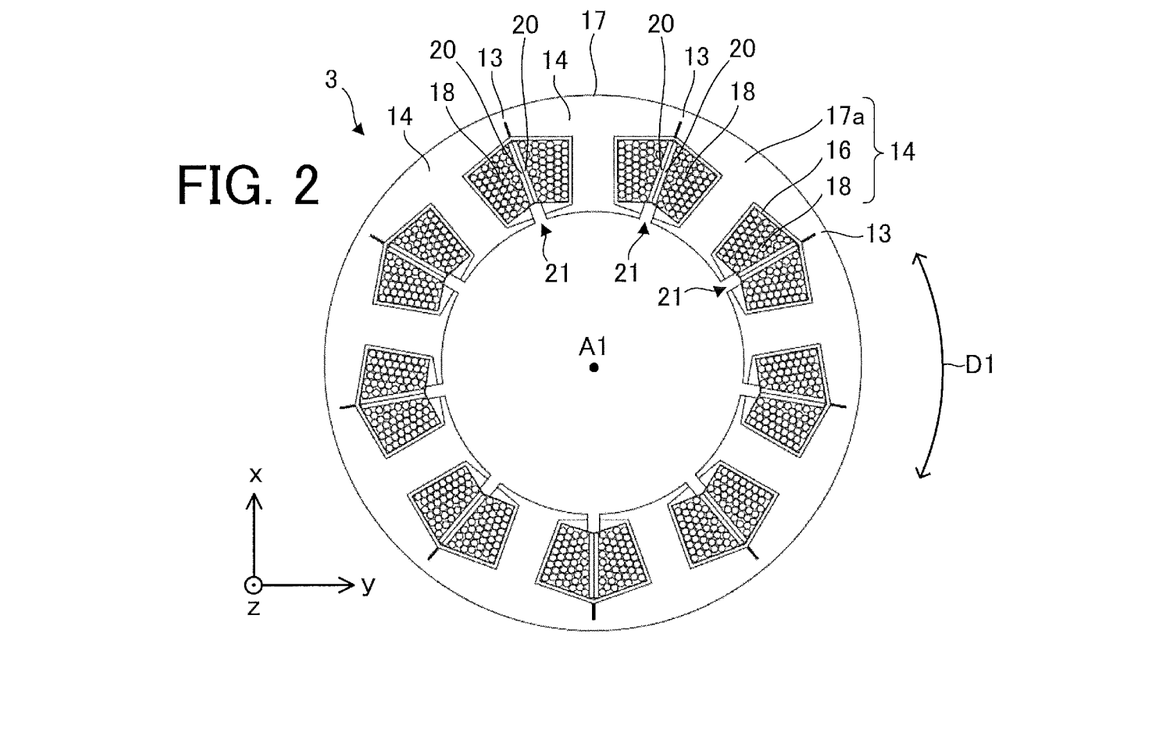
FIG. 2 is a plan view schematically illustrating a structure of a stator.

FIG. 2 is a plan view schematically illustrating a structure of the stator 3. An arrow D1 in FIG. 2 indicates the circumferential direction of the stator 3.

The stator 3 includes a stator core 17 formed in an annular shape, insulators 16 insulating the stator core 17, windings 18 wound around the stator core 17 with the insulators 16 in between, thermal conduction sheets 20 to conduct heat, and slots 21. The stator 3 is formed in an annular shape in the circumferential direction about the axis A1. The stator 3 (more specifically, the stator core 17) is held by the frame 4 (more specifically, the frame portion 4b). The rotor 2 is rotatably mounted inside the stator 3.

The stator 3 includes at least one split core 14. In this Embodiment, the stator 3 is formed of a plurality of split cores 14 (more specifically, nine split cores 14). In the example illustrated in FIG. 2, the plurality of split cores 14 are arranged in an annular shape in the circumferential direction about the axis A1 to form the stator 3. The stator 3 is fixed in the frame 4 (more specifically, the frame portion 4b) by a means such as press fitting or welding, and the outer circumferential surface of the stator core 17 is in contact with the interior of the frame portion 4b.

The stator core 17 is formed by, for example, stacking, in the axial direction, a plurality of electrical steel sheets stamped into a predetermined shape. The stator core 17 includes at least one yoke portion 15 (also called a core back), and a plurality of teeth 19 projecting inwards in the radial direction. The stator core 17 is formed of a plurality of stator cores 17a split (to be also referred to as the "split stator cores 17a" hereinafter). Therefore, each split stator core 17a includes the yoke portion 15 and the tooth 19.

As illustrated in FIG. 2, the plurality of teeth 19 are arranged in a radial pattern about the axis A1, and these teeth 19 are arranged at regular intervals in the circumferential direction. A region surrounded by two yoke portions 15 and two teeth 19 is the slot 21. The inner distal ends of the teeth 19 in the radial direction face the rotor 2. An air gap is formed between the rotor 2 and the distal ends of the teeth 19.

However, the stator 3 need not always be formed of the plurality of split stator cores 17a. The stator core 17 may be formed by, for example, stacking a plurality of annular materials (for example, electrical steel sheets or amorphous materials such as amorphous metals).

Figure 3:
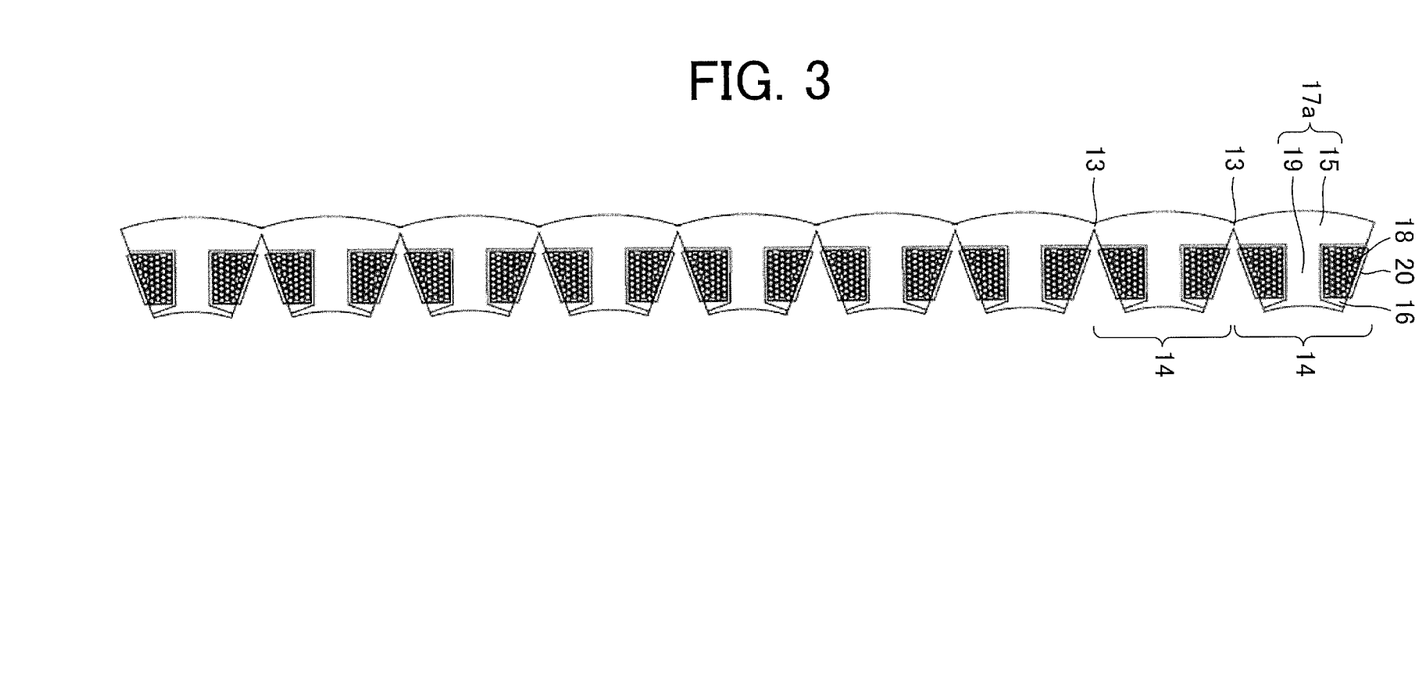
FIG. 3 is a diagram illustrating a plurality of split cores that are connected to each other.

FIG. 3 is a diagram illustrating the plurality of split cores 14 that are connected to each other.

Each split core 14 includes the split stator core 17a, the winding 18, and the insulator 16 insulating the split stator core 17a. The insulator 16 is made of an insulating material.

The stator 3 (more specifically, the stator core 17) includes connecting portions 13. In this Embodiment, the connecting portions 13 are thin portions on the two end sides of the yoke portion 15 in the circumferential direction. As illustrated in FIG. 3, a split core 14 (the uppermost split core 14 in FIG. 3) as a first split core is rotatably connected via the connecting portion 13 to a split core 14 as a second split core adjacent to the first split core. More specifically, the yoke portion 15 of one split stator core 17a is rotatably connected via the connecting portion 13 to the yoke portion 15 of another split stator core 17a adjacent to the former split stator core 17a.

The plurality of split cores 14 may be connected to each other via a structure other than the connecting portions 13 illustrated in FIG. 3. For example, a projection formed on the yoke portion 15 of a first split core (for example, the uppermost split core 14 in FIG. 3) to project in the axial direction may be rotatably fitted into a recess formed in the yoke portion 15 of a second split core adjacent to the first split core.

The windings 18 are wound around the stator core 17 with the insulators 16 in between to form coils for generating a rotating magnetic field. More specifically, the windings 18 are wound around the teeth 19 by concentrated winding. In the winding 18 (that is, the coil) wound around the stator core 17 with the insulator 16 in between, an end side part on the side A in the axial direction is referred to as a coil end 18a. In the winding 18 (that is, the coil) wound around the stator core 17 with the insulator 16 in between, an end side part on the side B in the axial direction is referred to as a coil end 18b.

As the winding scheme of the windings 18, concentrated winding is used, as described above. As illustrated in, for example, FIG. 3, in a state before the plurality of split cores 14 are arranged in an annular shape (for example, the state in which the plurality of split cores 14 are arranged linearly), the windings 18 can be wound around the split stator cores 17a. The split stator cores 17a (that is, the split cores 14) having the windings 18 wound around them are folded in an annular shape and fastened together by welding or the like.

The thermal conduction sheets 20 are wound around the windings 18. Accordingly, the thermal conduction sheets 20 are in contact with the windings 18. However, the thermal conduction sheets 20 need not always be wound around all the windings 18. The thermal conduction sheet 20 is made of, for example, a material containing silicone. The thermal conduction sheet 20 may be made of a material other than the material containing silicone, such as a material containing acrylic resin. The thickness of the thermal conduction sheet 20 is, for example, 1 mm to 3 mm. However, the thickness of the thermal conduction sheet 20 may be smaller than 1 mm, or may be larger than 3 mm.

Figure 4:
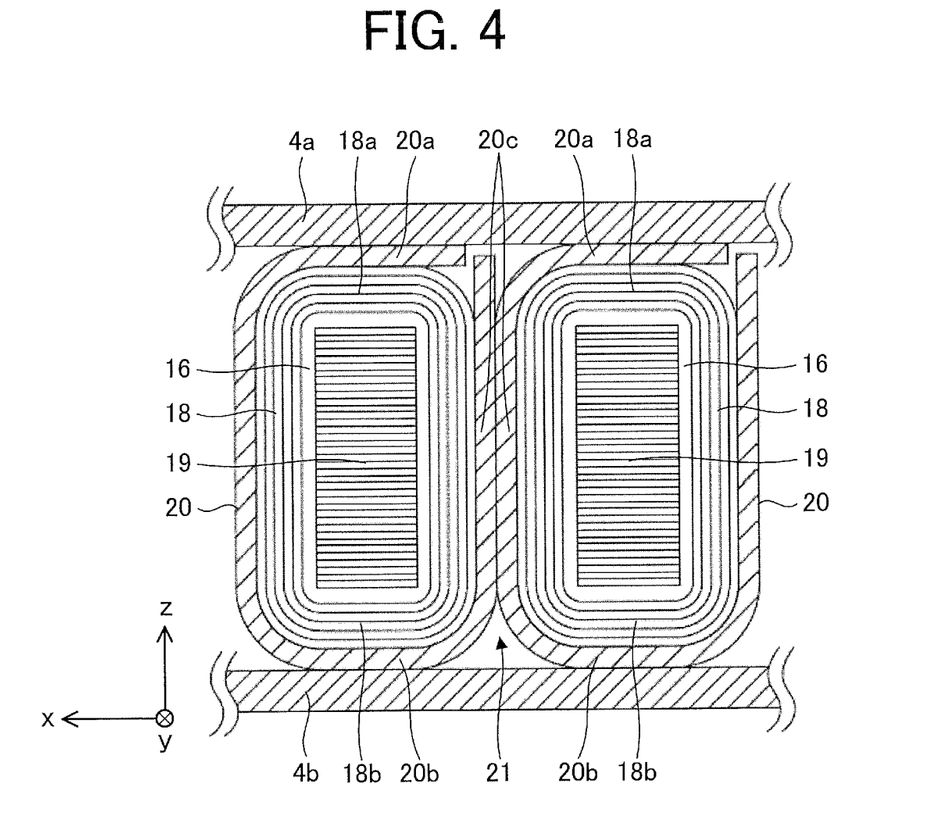
FIG. 4 is a sectional view taken along a line A4-A4 in FIG. 1.

FIG. 4 is a sectional view taken along a line A4-A4 in FIG. 1.

In the example illustrated in FIG. 4, a winding 18 (the left winding 18 in the example illustrated in FIG. 4) as a first winding is wound around a tooth 19 (the left tooth 19 in the example illustrated in FIG. 4) as a first tooth by concentrated winding with the insulator 16 in between. Similarly, a winding 18 (the right winding 18 in the example illustrated in FIG. 4) as a second winding is wound around a tooth 19 (the right tooth 19 in the example illustrated in FIG. 4) as a second tooth by concentrated winding with the insulator 16 in between.

The thermal conduction sheets 20 are wound around the windings 18. In other words, in the state where the thermal conduction sheets 20 are wound around the windings 18, the stator 3 is disposed in the frame portion 4b, and the frame portion 4a is combined with the frame portion 4b. Accordingly, the thermal conduction sheets 20 are held between the frame 4 and the windings 18 in a deformed state. More specifically, a first portion 20a that is a part of each thermal conduction sheet 20 is held between the coil end 18a and the frame portion 4a in a deformed state, and a second portion 20b that is another part of this thermal conduction sheet 20 is held between the coil end 18b and the frame portion 4b in a deformed state.

Since the thermal conduction sheets 20 are in contact with the frame portions 4a and 4b of the frame 4, heat from the windings 18 is conducted to the frame portions 4a and 4b of the frame 4 through the thermal conduction sheets 20.

In this Embodiment, deformation of the thermal conduction sheets 20 is elastic deformation. In other words, the thermal conduction sheets 20 are held between the frame 4 and the windings 18 in an elastically deformed state. Each thermal conduction sheet 20 need only be held between the frame 4 and at least one coil end (that is, the coil end 18a or 18b). In addition, one of the plurality of thermal conduction sheets 20 need only be held between the frame 4 and any winding 18 (for example, the first winding) in a deformed state.

In the slot 21, the thermal conduction sheets 20 are held between two teeth 19 adjacent to each other (more specifically, two windings 18 adjacent to each other) in a deformed state. In other words, third portions 20c of the thermal conduction sheets 20 are sandwiched between two teeth 19 adjacent to each other (more specifically, two windings 18 adjacent to each other) in a deformed state and thus fixed.

In the example illustrated in FIG. 4, two thermal conduction sheets 20 are held between a winding 18 (the left winding 18 in the example illustrated in FIG. 4) as a first winding and a winding 18 (the right winding 18 in the example illustrated in FIG. 4) as a second winding. Two thermal conduction sheets 20 adjacent to each other are in contact with each other. At least one thermal conduction sheet 20 is further in contact with the frame 4. With this arrangement, the thermal conduction sheets 20 conduct heat from the windings 18 to the frame 4 and exhaust the heat from the windings 18 outside the electric motor 1.

Deformation of the thermal conduction sheets 20 may be plastic deformation. In this case, the thermal conduction sheets 20 are held between the frame 4 and the windings 18 in a plastically deformed state. For example, the first portions 20a of the thermal conduction sheets 20 are held between the coil ends 18a and the frame portion 4a in a plastically deformed state, the second portions 20b of the thermal conduction sheets 20 are held between the coil ends 18b and the frame portion 4b in a plastically deformed state, and the third portions 20c of the thermal conduction sheets 20 are held between two teeth 19 adjacent to each other (more specifically, two windings 18 adjacent to each other) in a plastically deformed state.

A method for producing the electric motor 1 will be described below.

Figure 5:
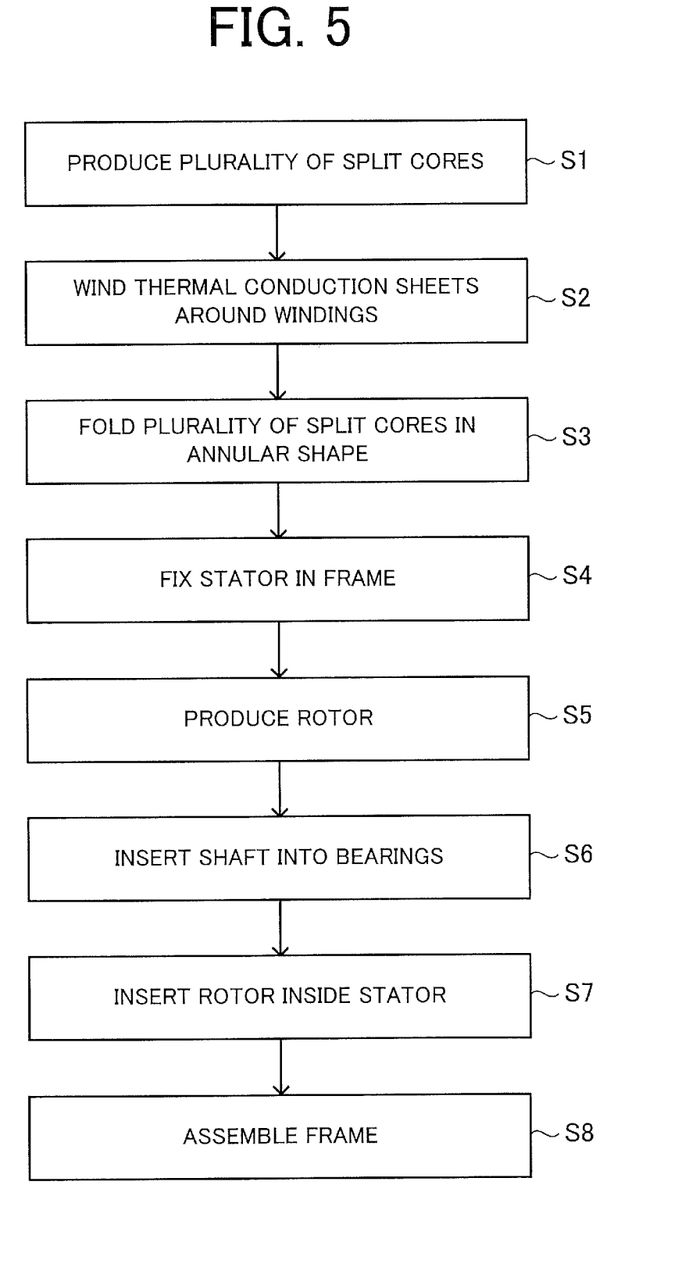
FIG. 5 is a flowchart illustrating an example of a process of producing the electric motor.

FIG. 5 is a flowchart illustrating an example of a process of producing the electric motor 1. The method for producing the electric motor 1 includes the following steps.

In step S1, the plurality of split cores 14 are produced. For example, the stator core 17 is formed by stacking the plurality of electrical steel sheets in the axial direction. The insulator 16 is disposed on the side surfaces of the yoke portion 15 and the tooth 19 of the stator core 17. The plurality of split cores 14 can be produced by winding a winding 18 around each tooth 19 by concentrated winding with the insulator 16 in between.

Figure 6:
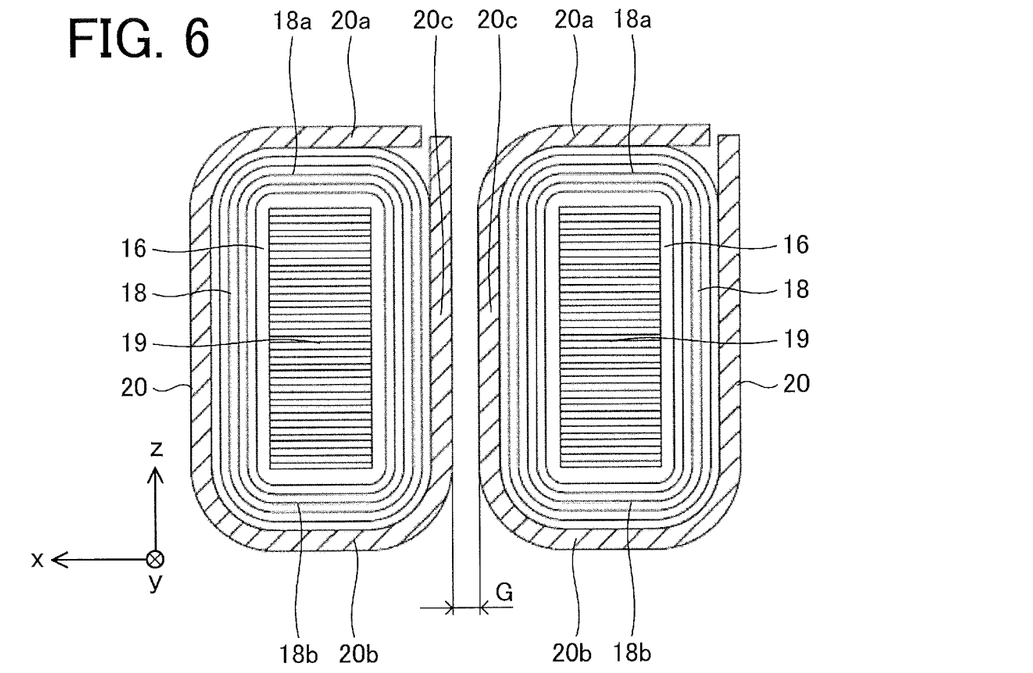
FIG. 6 is a diagram illustrating an example of processing in step S2 of the process of producing the electric motor.

FIG. 6 is a diagram illustrating an example of processing in step S2 of the process of producing the electric motor 1.

In step S2, in a state before the plurality of split cores 14 are arranged in an annular shape (for example, the state in which the plurality of split cores 14 are arranged linearly, as illustrated in FIG. 3), the thermal conduction sheets 20 are interposed between the windings 18. In this Embodiment, the thermal conduction sheet 20 is wound around the winding 18 of each split core 14, as illustrated in FIG. 6. In the example illustrated in FIG. 6, one of the thermal conduction sheets 20 (the left thermal conduction sheet 20 in FIG. 6) as a first thermal conduction sheet is wound around one of the windings 18 (the left winding 18 in FIG. 6) as a first winding, and another one of the thermal conduction sheets 20 (the right thermal conduction sheet 20 in FIG. 6) as a second thermal conduction sheet is wound around another one of the windings 18 (the right winding 18 in FIG. 6) as a second winding.

In the state where the plurality of split cores 14 are arranged linearly, a gap G is formed between two teeth 19 adjacent to each other, and therefore the thermal conduction sheets 20 can be easily wound around the windings 18. The length of the gap G need only be set within the range in which the thermal conduction sheets 20 are deformable when the stator 3 is in an assembled state.

In step S3, the plurality of split cores 14 are folded in an annular shape, and the split cores 14 at the opposite ends are fastened together by welding or the like. More specifically, the plurality of split cores 14 are folded in an annular shape so that in a slot 21, parts (more specifically, third portions 20c) of the thermal conduction sheets 20 are held between two teeth 19 adjacent to each other (more specifically, two windings 18 adjacent to each other). With this operation, in the slot 21, the thermal conduction sheets 20 (more specifically, the third portions 20c of the thermal conduction sheets 20) are held between the two teeth 19 adjacent to each other (more specifically, the two windings 18 adjacent to each other) in a deformed state. The stator 3 is thus formed.

In step S4, the stator 3 (that is, the plurality of split cores 14 and the plurality of thermal conduction sheets 20) is fixed in the frame 4. More specifically, the stator 3 is fixed in the frame portion 4b by a means such as press fitting or welding. In fixing the stator 3 in the frame portion 4b, the stator 3 is disposed in the frame portion 4b so that the thermal conduction sheets 20 come in contact with the frame 4. More specifically, in fixing the stator 3 in the frame portion 4b, the stator 3 is disposed in the frame portion 4b so that parts (more specifically, the second portions 20b) of the thermal conduction sheets 20 are held between the frame 4 (more specifically, the frame portion 4b) and parts (more specifically, the coil ends 18b) of the windings 18 in a deformed state.

In step S5, the rotor 2 is produced. The rotor 2 is obtained by, for example, inserting the shaft 10 into the shaft hole 11 formed in the rotor core 7. The permanent magnet 8 for forming magnetic poles may be mounted on the rotor core 7 in advance.

In step S6, the shaft 10 is inserted into the bearings 5a and 5b.

The order of steps S1 to S6 is not limited to that illustrated in FIG. 5. For example, steps S1 to S4, and step S5 can be executed concurrently with each other. Step S5 may be executed earlier than steps S1 to S4.

In step S7, the compression spring 6 is disposed on the closed bottom portion 42c of the frame portion 4b, and the rotor 2 is inserted inside the stator 3 together with the bearings 5a and 5b.

In step S8, the frame 4 is assembled. More specifically, the frame 4 is assembled by combining the frame portion 4a with the frame portion 4b so that the first portions 20a of the thermal conduction sheets 20 are held between the coil ends 18a and the frame portion 4a. With this operation, the first portions 20a of the thermal conduction sheets 20 are held between the coil ends 18a and the frame portion 4a in a deformed state, and the second portions 20b of the thermal conduction sheets 20 are held between the coil ends 18b and the frame portion 4b in a deformed state. However, each thermal conduction sheet 20 may be held between the frame 4 and at least one coil end (that is, the coil end 18a or 18b).

Through the above-mentioned processes, the electric motor 1 is assembled.

Modification 1.

Figure 7:
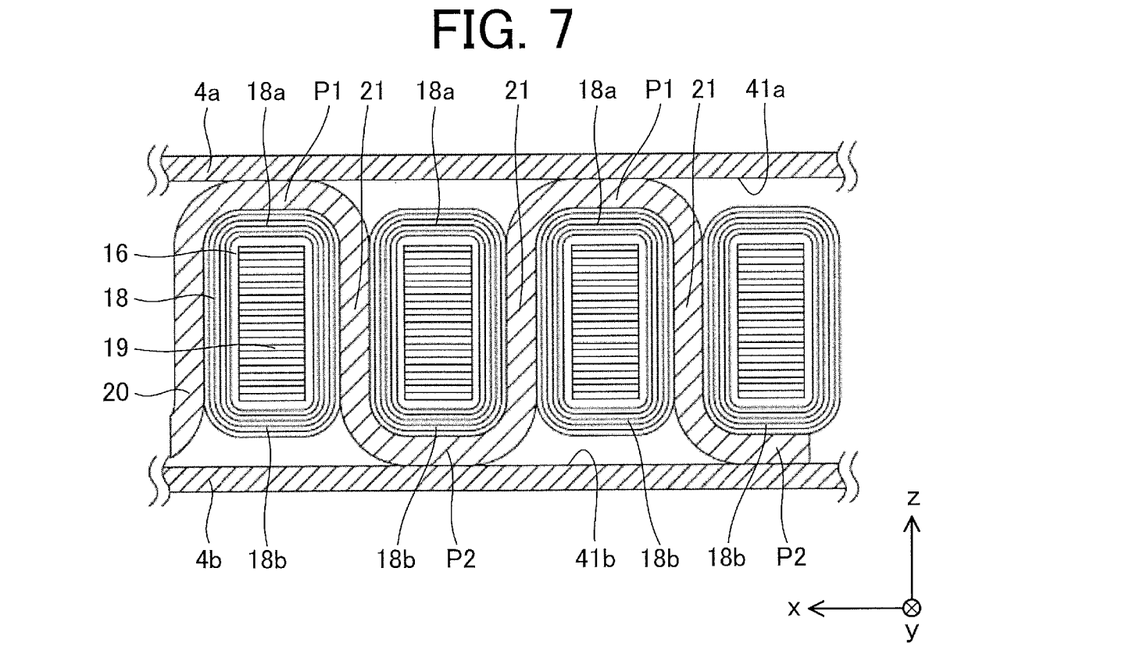
FIG. 7 is a diagram illustrating another example of a method for disposing a thermal conduction sheet.

FIG. 7 is a diagram illustrating another example of a method for disposing the thermal conduction sheet 20.

A thermal conduction sheet 20 may be disposed on the stator 3 in a manner illustrated in FIG. 7, in place of the method for disposing the thermal conduction sheet 20 in above-described Embodiment 1. In the example illustrated in FIG. 7, one thermal conduction sheet 20 is alternately in contact with inner surfaces 41a and 41b in the circumferential direction. In other words, the thermal conduction sheet 20 is provided in the stator 3 so as to be located in the order of a first position P1, a slot 21, and a second position P2 in the circumferential direction. The first position P1 is a position between a frame 4 on the side A (more specifically, the inner surface 41a of the frame portion 4a) and a winding 18 on the side A (more specifically, the coil end 18a). The second position P2 is a position between the frame 4 on the side B (more specifically, the inner surface 41b of the frame portion 4b) and a winding 18 on the side B (more specifically, the coil end 18b).

A part of the thermal conduction sheet 20 is held between the frame 4 and the winding 18 at the first position P1, another part of the thermal conduction sheet 20 is held between two teeth 19 adjacent to each other (more specifically, two windings 18 adjacent to each other) in slot 21, and still another part of the thermal conduction sheet 20 is held between the frame 4 and the winding 18 at the second position P2.

Modification 2.

Figure 8:
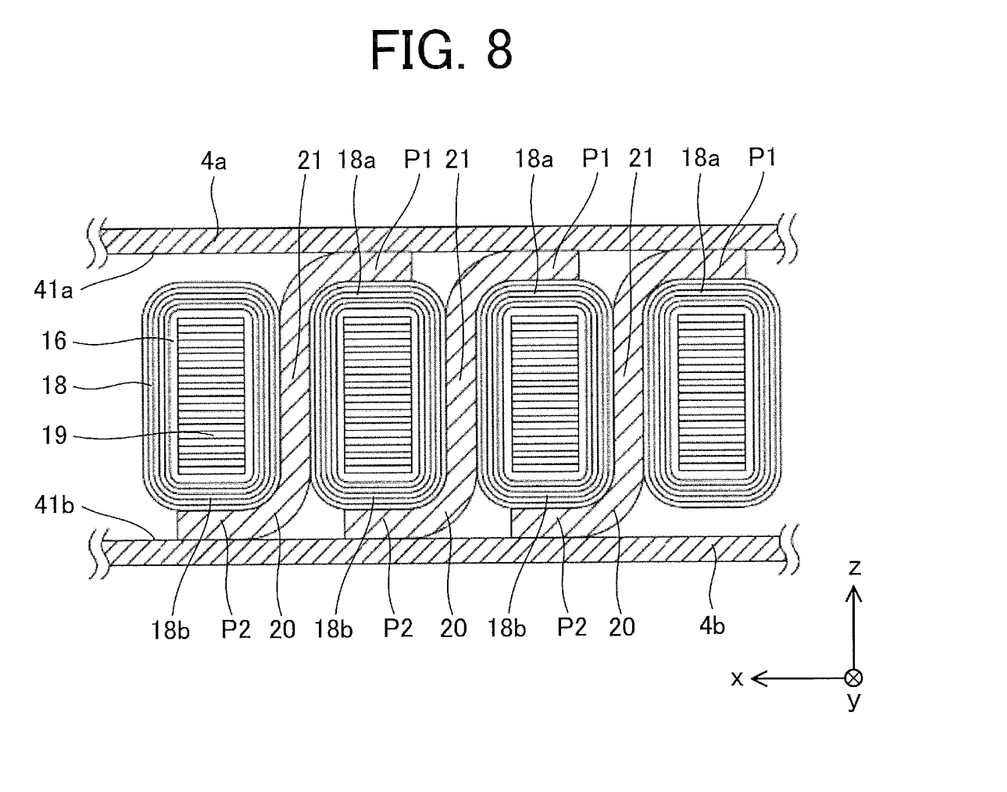
FIG. 8 is a diagram illustrating still another example of the method for disposing the thermal conduction sheet.

FIG. 8 is a diagram illustrating still another example of the method for disposing the thermal conduction sheet 20.

A plurality of thermal conduction sheets 20 may be disposed on the stator 3 in a manner illustrated in FIG. 8, in place of the method for disposing the thermal conduction sheet 20 in above-described Embodiment 1. In the example illustrated in FIG. 8, each thermal conduction sheet 20 is provided in the stator 3 so as to be located in the order of a first position P1, a slot 21, and a second position P2 in the circumferential direction. Each thermal conduction sheet 20 may be provided in the stator 3 so as to be located in the order of the second position P2, the slot 21, and the first position P1 in the circumferential direction.

A part of the thermal conduction sheet 20 is held between the frame 4 and one winding 18 at the first position P1, another part of the thermal conduction sheet 20 is held between two teeth 19 adjacent to each other (more specifically, two windings 18 adjacent to each other) in the slot 21, and still another part of the thermal conduction sheet 20 is held between the frame 4 and another winding 18 at the second position P2.

Effects of the electric motor 1 according to Embodiment 1 (including the Modifications) and the method for producing the electric motor 1 will be described below.

Generally, of the total heat generated by an electric motor during driving of the electric motor, heat from windings (more specifically, heat generated due to copper losses), and heat from a stator core (more specifically, heat generated due to iron losses) are dominant. In the electric motor, although heat is generated not only from the windings and the stator core, but also from a rotor core (more specifically, heat generated due to iron losses), permanent magnets (more specifically, heat generated due to eddy current losses), and bearings (more specifically, heat generated due to mechanical losses), the heat from these components is lower than the heat from the windings and the stator core.

In this Embodiment, the stator 3 is disposed in the frame 4 (more specifically, the frame portion 4b), and the stator core 17 is in contact with the frame 4 (more specifically, the frame portion 4b). This makes it possible to conduct heat of the stator core 17 to the frame 4 and exhaust the heat of the stator core 17 outside the electric motor 1.

Generally, since the winding has a circular cross-sectional shape, the area of a portion that is in contact with the insulator is small. Furthermore, the insulator normally exhibits low thermal conductivity. Therefore, heat from the winding is not easily conducted to the insulator. When the difference in temperature between the winding and the stator core is small, the heat conducted from the winding to the insulator is not easily conducted to the stator core. As a result, the heat from the winding is not easily exhausted outside the electric motor.

In this Embodiment, the thermal conduction sheets 20 are interposed between the coil ends 18a and the frame portion 4a and in close contact with the coil ends 18a and the frame portion 4a. This makes it possible to conduct heat of the windings 18 from the coil ends 18a to the frame portion 4a through the thermal conduction sheets 20 and exhaust the heat of the windings 18 outside the electric motor 1.

The thermal conduction sheets 20 are also interposed between the coil ends 18b and the frame portion 4b and in close contact with the coil ends 18b and the frame portion 4b. This makes it possible to conduct heat of the windings 18 from the coil ends 18b to the frame portion 4b through the thermal conduction sheets 20 and exhaust the heat outside the electric motor 1.

The thermal conduction sheets 20 are in close contact with adjacent windings 18 in an elastically or plastically deformed state in the slots 21. With this arrangement, since the contact area of the thermal conduction sheet 20 is larger than in a structure in which the thermal conduction sheets 20 are in contact with only the coil ends 18a and 18b, heat of the windings 18 is more quickly conducted to the thermal conduction sheets 20. As a result, the cooling performance of the electric motor 1 can be improved.

The thermal conduction sheets 20 are held by two windings 18 adjacent to each other in the slot 21, and therefore it is possible to prevent the thermal conduction sheets 20 from detaching from the stator 3.

By using thermal conduction sheets 20 having a modulus of elasticity, even if a component constituting the electric motor 1 deforms due to a change in temperature, since deformation of the thermal conduction sheets 20 makes it possible to absorb the deformation of the component of the electric motor 1, contact with the frame 4 and contact with the windings 18 can be maintained.

In the process of producing the electric motor 1, even if components constituting the electric motor 1 have dimensional variations, deformation of the thermal conduction sheets 20 makes it possible to absorb the dimensional variations. This makes it possible to bring the thermal conduction sheets 20 into contact with the windings 18 and the frame 4.

In this Embodiment, heat of the windings 18 is conducted to the frame 4 through the thermal conduction sheets 20 and exhausted outside the electric motor 1. However, heat of the windings 18 may be conducted to a metal component other than the frame 4 and exhausted outside the electric motor 1. In other words, the metal component is not limited to the frame 4 as long as it allows heat of the windings 18 to be exhausted outside the electric motor 1. In this case, the metal component that is in contact with the thermal conduction sheets 20 is implemented as, for example, a heat radiating fin. When the heat radiating fin is used, one end side of the heat radiating fin is in contact with the thermal conduction sheets 20, and the other end side of the heat radiating fin is exposed outside the electric motor 1. Accordingly, even when a metal component other than the frame 4 is used, heat of the windings 18 can be exhausted outside the electric motor 1.

When the stator 3 is formed of the plurality of split cores 14, the stator 3 can be easily assembled in the state where the thermal conduction sheets 20 are in contact with the windings 18, in the process of producing the electric motor 1. For example, in steps S2 to S3 of the above-mentioned process of producing the electric motor 1, it is possible to wind the thermal conduction sheet 20 around the winding 18 of each split core 14 and then fold the plurality of split cores 14 in an annular shape. This makes it possible to hold the thermal conduction sheets 20 by two teeth 19 (more specifically, two windings 18) in the slot 21. As a result, the stator 3 can be easily assembled, and the production cost of the electric motor 1 can thus be cut.

The yoke portion 15 of one stator core 17 is rotatably connected at the connecting portion 13 to another yoke portion 15 of the adjacent stator core 17. This makes it possible to easily fold the plurality of split cores 14 in an annular shape.

When the connecting portions 13 are thin, since they readily deform, the plurality of split cores 14 can be easily folded in an annular shape. In addition, since the number of components can be reduced, the production cost of the electric motor 1 can be cut.

In the electric motor according to Modification 1, one thermal conduction sheet 20 is alternately in contact with the inner surfaces 41a and 41b in the circumferential direction. In this case, there is no need to use a large number of thermal conduction sheets 20, and therefore the production cost of the electric motor can be cut.

Embodiment 2

An air conditioner 50 according to Embodiment 2 of the present invention will be described below.

Figure 9:
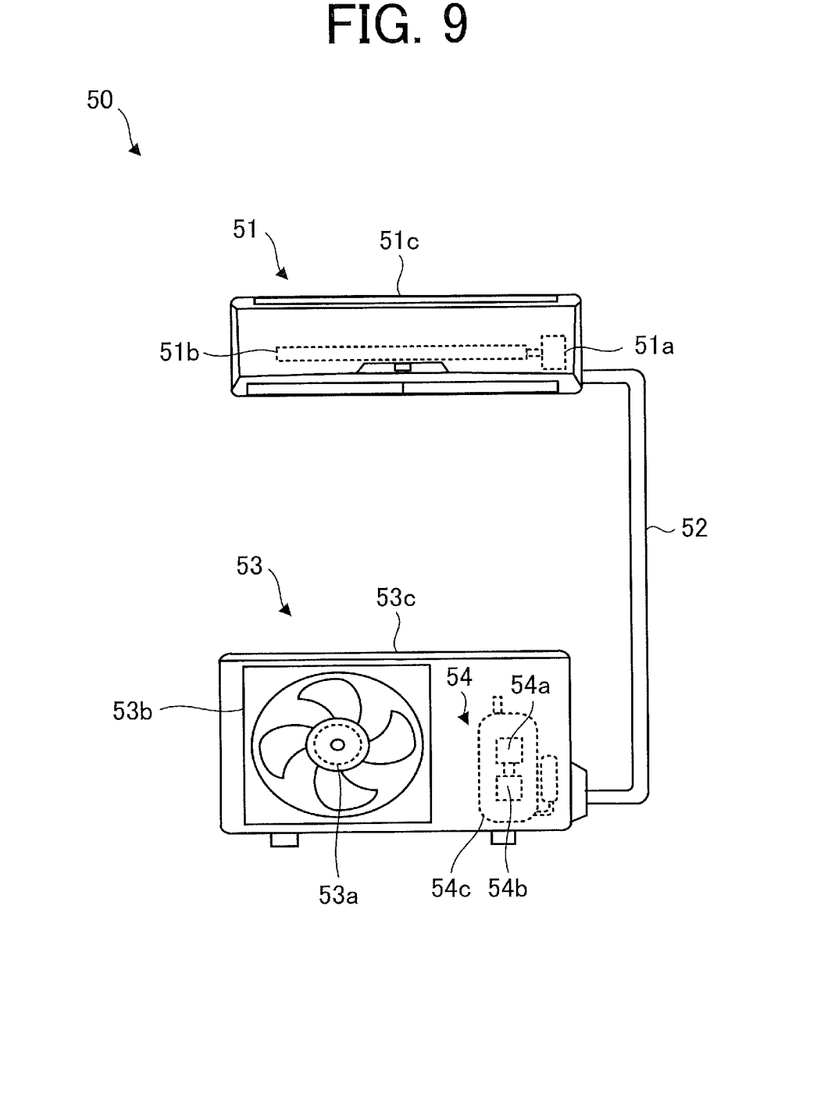
FIG. 9 is a diagram schematically illustrating a configuration of an air conditioner according to Embodiment 2 of the present invention.

FIG. 9 is a diagram schematically illustrating a configuration of the air conditioner 50 according to Embodiment 2 of the present invention.

The air conditioner 50 (for example, a refrigerating and air conditioning apparatus) according to Embodiment 2 includes an indoor unit 51 as a fan (first fan), refrigerant piping 52, and an outdoor unit 53 as a fan (second fan) connected to the indoor unit 51 via the refrigerant piping 52.

The indoor unit 51 includes an electric motor 51a (for example, the electric motor 1 according to Embodiment 1), an air blower 51b driven by the electric motor 51a to blow air, and a housing 51c covering the electric motor 51a and the air blower 51b. The air blower 51b includes, for example, blades driven by the electric motor 51a.

The outdoor unit 53 includes an electric motor 53a (for example, the electric motor 1 according to Embodiment 1), an air blower 53b, a compressor 54, and a heat exchanger (not illustrated). The air blower 53b is driven by the electric motor 53a to blow air. The air blower 53b includes, for example, blades driven by the electric motor 53a. The compressor 54 includes an electric motor 54a (for example, the electric motor 1 according to Embodiment 1), a compression mechanism 54b (for example, a refrigerant circuit) driven by the electric motor 54a, and a housing 54c covering the electric motor 54a and the compression mechanism 54b.

In the air conditioner 50, at least one of the indoor unit 51 or the outdoor unit 53 includes the electric motor 1 described in Embodiment 1 (including the Modifications). More specifically, as a driving source for the air blower, the electric motor 1 described in Embodiment 1 is applied to at least one of the electric motors 51a or 53a. As the electric motor 54a of the compressor 54, the electric motor 1 described in Embodiment 1 (including the Modifications) may even be used.

The air conditioner 50 can perform an operation such as a cooling operation for blowing cold air from the indoor unit 51, or a heating operation for blowing hot air from the indoor unit 51. In the indoor unit 51, the electric motor 51a serves as a driving source for driving the air blower 51b. The air blower 51b can blow conditioned air.

With the air conditioner 50 according to Embodiment 2, since the electric motor 1 described in Embodiment 1 (including the Modifications) is applied to at least one of the electric motors 51a or 53a, the same effect as that described in Embodiment 1 can be obtained. This makes it possible to prevent a failure of the air conditioner 50 due to heat generated by the electric motor. By using the electric motor 1 described in Embodiment 1 in the air conditioner 50, the production cost of the air conditioner 50 can be cut.

By using the electric motor 1 according to Embodiment 1 (including the Modifications) as a driving source for a fan (for example, the indoor unit 51), the same effect as that described in Embodiment 1 can be obtained. This makes it possible to prevent a failure of the fan due to heat generated by the electric motor.

By using the electric motor 1 according to Embodiment 1 (including the Modifications) as a driving source for the compressor 54, the same effect as that described in Embodiment 1 can be obtained. This makes it possible to prevent a failure of the compressor 54 due to heat generated by the electric motor.

The electric motor 1 described in Embodiment 1 can be mounted not only in the air conditioner 50, but also in an apparatus including a driving source, such as a ventilating fan, a household electrical appliance, or a machine tool.

Embodiment 3

Figure 10:
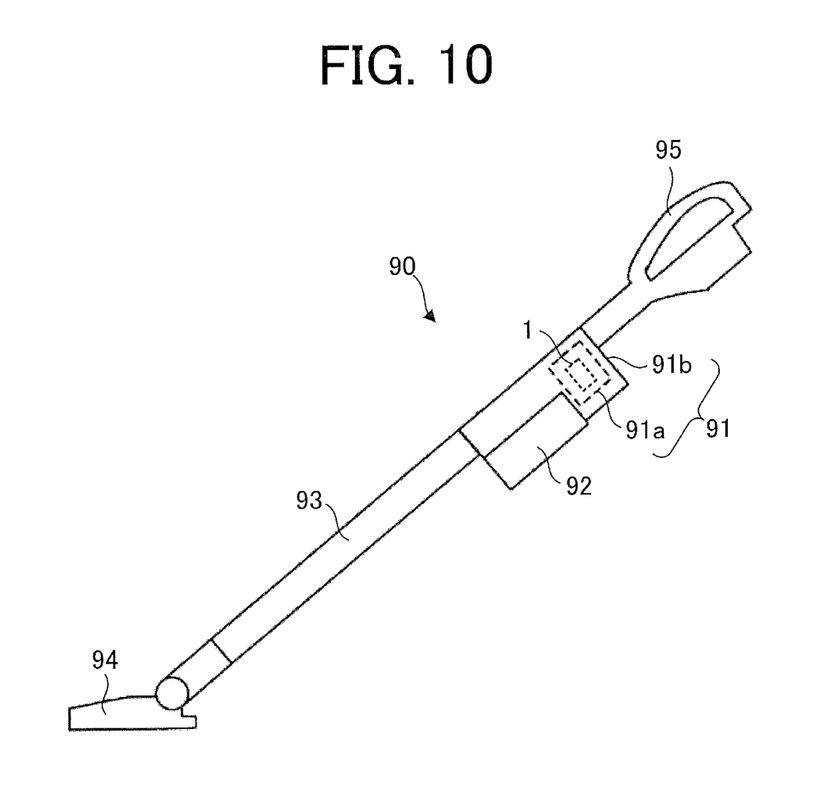
FIG. 10 is a side view schematically illustrating a vacuum cleaner according to Embodiment 3 of the present invention.

FIG. 10 is a side view schematically illustrating a vacuum cleaner 90 (also simply called a "cleaner") according to Embodiment 3 of the present invention.

The vacuum cleaner 90 includes a main body 91, a dust chamber 92, a duct 93, a suction nozzle 94, and a gripping portion 95.

The main body 91 includes an electric blower 91a to generate suction force (suction air) and send dust to the dust chamber 92, and an exhaust port 91b. The electric blower 91a includes a fan (not illustrated), and an electric motor 1 to rotate the fan.

The dust chamber 92 is mounted on the main body 91. However, the dust chamber 92 may be provided inside the main body 91. The dust chamber 92 is implemented as, for example, a container including a filter to separate dust and air. The suction nozzle 94 is mounted at the distal end of the duct 93.

When the vacuum cleaner 90 is turned on, power is supplied to the electric blower 91a, which can thus be driven. During driving of the electric blower 91a, dust is drawn from the suction nozzle 94 by suction using the suction force generated by the electric blower 91a. The dust drawn from the suction nozzle 94 by suction is collected in the dust chamber 92 through the duct 93. The air drawn from the suction nozzle 94 by suction is exhausted outside the vacuum cleaner 90 from the exhaust port 91b through the electric blower 91a.

The vacuum cleaner 90 according to Embodiment 3 includes the electric motor 1 described in Embodiment 1, and therefore has the same effect as that described in Embodiment 1.

In addition, since the vacuum cleaner 90 according to Embodiment 3 includes the electric motor 1 described in Embodiment 1, a failure of the vacuum cleaner 90 due to heat generated by the electric motor can be prevented. By using the electric motor 1 described in Embodiment 1 in the vacuum cleaner 90, the production cost of the vacuum cleaner 90 can be cut.

What is claimed is:

1. An electric motor comprising:
a stator; and
a metal component that is in contact with the stator,
the stator including
a first tooth,
a second tooth,
a first winding wound around the first tooth by concentrated winding,
a second winding wound around the second tooth by concentrated winding,
a first insulator provided between the first tooth and the first winding,
a second insulator provided between the second tooth and the second winding, a first thermal conduction sheet held between the first winding and the second winding and to conduct heat of the first winding to the metal component, the first thermal conduction sheet being different from the first insulator, and a second thermal conduction sheet held between the first winding and the second winding and to conduct heat of the second winding to the metal component, the second thermal conduction sheet being different from the second insulator, wherein the first thermal conduction sheet is wound around the first tooth and the first winding wound around the first tooth, the second thermal conduction sheet is wound around the second tooth and the second winding wound around the second tooth, the first thermal conduction sheet is held between the metal component and the first winding in a deformed state, and the second thermal conduction sheet is held between the metal component and the second winding in a deformed state.

2. The electric motor according to claim 1, wherein
the stator includes a first split core and a second split core,
the first split core includes
the first tooth, and
the first winding wound around the first tooth, and
the second split core includes
the second tooth, and
the second winding wound around the second tooth.

3. The electric motor according to claim 2, wherein
the stator includes a connecting portion, and
the first split core is rotatably connected to the second split core via the connecting portion.

4. The electric motor according to claim 1, wherein the first thermal conduction sheet is held between the metal component and the first winding in an elastically deformed state.

5. The electric motor according to claim 1, wherein the first thermal conduction sheet is held between the metal component and the first winding in a plastically deformed state.

6. The electric motor according to claim 1, wherein the first thermal conduction sheet is held between the first winding and the second winding in a deformed state.

7. The electric motor according to claim 6, wherein the second thermal conduction sheet is held between the first winding and the second winding in an elastically deformed state.

8. The electric motor according to claim 6, wherein the second thermal conduction sheet is held between the first winding and the second winding in a plastically deformed state.

9. The electric motor according to claim 1, wherein at least a part of the metal component is exposed outside the electric motor.

10. The electric motor according to claim 1, wherein the metal component is a metal frame covering the stator.

11. An air conditioner comprising:
an indoor unit; and
an outdoor unit connected to the indoor unit,
at least one of the indoor unit or the outdoor unit including the electric motor according to claim 1.

12. A vacuum cleaner comprising:
a dust chamber; and
an electric blower to generate suction force and send dust to the dust chamber,
the electric blower including the electric motor according to claim 1.

13. An electric motor comprising:
a stator; and
a metal component that is in contact with the stator,
the stator including
a first tooth,
a second tooth,
a first winding wound around the first tooth by concentrated winding,
a second winding wound around the second tooth by concentrated winding, and
a thermal conduction sheet held between the first winding and the second winding and to conduct heat of the first winding and the second winding to the metal component, wherein
the thermal conduction sheet is held between the metal component and the first winding in a deformed state, and
the thermal conduction sheet is held between the metal component and the second winding in a deformed state, wherein
the metal component includes
a first inner surface formed on one end side in an axial direction, and
a second inner surface formed on the other end side in the axial direction, and
the thermal conduction sheet is alternately in contact with the first inner surface and the second inner surface in a circumferential direction.

14. A method for producing an electric motor including a first split core including a first winding, a second split core including a second winding, a metal component covering the first split core and the second split core, a first thermal conduction sheet to conduct heat, and a second thermal conduction sheet to conduct heat, the method comprising:
producing the first split core and the second split core, the first split core including a first tooth and a first insulator disposed on the first tooth, the second split core including a second tooth and a second insulator disposed on the second tooth, the first insulator being different from the first thermal conduction sheet, the second insulator being different from the second thermal conduction sheet;
winding the first thermal conduction sheet around the first tooth and the first winding wound around the first tooth and winding the second thermal conduction sheet around the second tooth and the second winding wound around the second tooth;
folding the first split core and the second split core so that the first thermal conduction sheet and the second thermal conduction sheet are held between the first winding and the second winding; and
disposing the first split core and the second split core in the metal component so that the first thermal conduction sheet and the second thermal conduction sheet come in contact with the metal component in a deformed state.

* * * * *